US012682741B2

(12) United States Patent
Lai

(10) Patent No.: US 12,682,741 B2
(45) Date of Patent: Jul. 14, 2026

(54) PERSONAL PROTECTION ALARM DEVICE

(71) Applicant: Desmond Lai, Mono (CA)

(72) Inventor: Desmond Lai, Mono (CA)

(73) Assignee: MARKLYN Group Inc, Mono (CA)

(*) Notice: Subject to any disclaimer, the term of this patent is extended or adjusted under 35 U.S.C. 154(b) by 18 days.

(21) Appl. No.: 18/741,734

(22) Filed: Jun. 12, 2024

(65) Prior Publication Data

US 2025/0384761 A1 Dec. 18, 2025

(51) Int. Cl.
*G09F 25/00* (2006.01)
*G08B 25/01* (2006.01)

(52) U.S. Cl.
CPC .................................. *G08B 25/016* (2013.01)

(58) Field of Classification Search
CPC .................................................... G08B 25/016
USPC ..................................................... 340/286.01
See application file for complete search history.

(56) References Cited

U.S. PATENT DOCUMENTS 5,392,029 A * 2/1995 Chang .................. G08B 15/005 463/47.4
5,512,881 A * 4/1996 Majmudar ......... G08B 21/0297 340/546
5,929,761 A * 7/1999 Van der Laan ........ H04M 11/04 379/38
7,002,466 B2 * 2/2006 Goehring ............. G08B 25/016 340/568.4
7,040,777 B2 * 5/2006 Yuen .................... G08B 15/004 362/228
7,800,482 B1 * 9/2010 Costin .................. G08B 15/004 340/321
10,192,409 B2 * 1/2019 Schmidt ................... G08B 3/10
2010/0053941 A1 * 3/2010 Ibison .................... A45C 15/06 362/156
2022/0013000 A1 * 1/2022 Ding ................... H04L 12/1895

* cited by examiner

*Primary Examiner* — Tai T Nguyen

(57) ABSTRACT

A portable personal security alarm device that incorporates a piercing alarm and a strobe light, the device having an triggering mechanism. The invention comprises a two-part housing, referred to herein as the finger pull handle and a body. The finger pull handle has an aperture for inserting a finger, making it easy to grasp and pull, while the top of the finger pull handle provides a comfortable surface for the finger to rest against. The housing is resilient to protect the components from environmental factors and provide a mounting mechanism for the internal electromechanical components and circuitry. Within the body are the electromechanical components providing the personal alarm functionality including power source(s), switch(es) and a load.

1 Claim, 10 Drawing Sheets

PERSONAL PROTECTION ALARM DEVICE

CROSS REFERENCE TO RELATED APPLICATION

Not applicable.

TECHNICAL FIELD

The present invention relates to personal protection devices.

BACKGROUND

Violent crime encompasses a range of offenses that involve the use of force or threat of force against individuals or groups. These crimes often result in physical harm, injury, or death and can have severe psychological and emotional impacts on victims and communities.

Homicide is the most serious form of violent crime and involves the unlawful killing of one person by another. Homicide can be classified into different categories, including murder which is the intentional killing of another person with premeditation and malice aforethought. Manslaughter is the unlawful killing of another person without premeditation or malice, often occurring in the heat of passion or under circumstances that do not constitute murder and negligent homicide is the unintentional killing of another person due to reckless or negligent behavior.

Assault involves the intentional infliction of physical harm or injury on another person. It can be classified into different degrees based on the severity of the offense and the intent of the perpetrator such as simple Assault which is the unlawful attempt or threat to inflict bodily harm on another person without a deadly weapon. Aggravated assault is the unlawful attempt or threat to inflict serious bodily harm on another person, often involving the use of a deadly weapon. Sexual assault is the non-consensual sexual contact of another person through force, coercion, or manipulation. Domestic violence is the assault that occurs within the context of a domestic relationship, such as between spouses, partners, or family members.

Robbery involves the theft of property or valuables from another person through force, intimidation, or violence. It typically occurs in a public place or private residence and can involve the use of weapons or physical force to overcome resistance from the victim. Kidnapping involves the unlawful abduction or confinement of another person against their will.

These are just a few examples of violent crime, and there are many other forms of violence that can occur in various contexts and settings.

Often one will desire to have a device to protect themselves from being a victim of crime. Personal protection devices used to protect against criminals vary depending on individual preferences, legal regulations, and the level of protection desired. Some common personal protection devices include pepper spray, stun guns, tactical flashlight, personal alarm, self-defensive keychain, whistle, dog, concealed carry weapon or security application. Each of these have their disadvantageous.

Pepper spray, also known as OC spray (oleoresin capsicum), is a non-lethal self-defense tool that irritates the eyes, causing temporary blindness, pain, and difficulty breathing. It is compact, easy to carry, and legal for self-defense in many jurisdictions. But it has a short useful life, can be turned against the user and is difficult to operate. A stun gun delivers an electric shock to incapacitate an attacker temporarily. It is handheld and emits an electrical charge upon contact with the target's body. Stun guns are effective for close-range self-defense but may be subject to legal restrictions in some areas. A tactical flashlight is a high-intensity flashlight designed for self-defense purposes. It can temporarily blind and disorient attackers, allowing the user to escape or call for help. Some tactical flashlights also feature a strobe mode for additional disorientation. But these are not too effective at stopping an assailant. A personal alarm emits a loud, attention-grabbing sound when activated. It serves as a deterrent by alerting others to the presence of danger and can startle or disorient attackers. Some personal alarms are small, portable, and easy to use but use complex connecting devices that are sometimes unreliable. Self-defense keychains are compact devices that can be attached to keys or carried discreetly. They often feature sharp edges, pointed tips, or other features designed to inflict pain or incapacitate an attacker in a self-defense situation. But these can also be turned on the user by the assailant and are difficult to master. A whistle is a simple self-defense tool that can attract attention and may scare off attackers. It is small, lightweight, and can be carried on a keychain or worn around the neck for easy access. However, these do not incapacitate the user. A well-trained dog can provide both companionship and protection against potential threats. Personal protection dogs are trained to alert their owners to danger, deter criminals through their presence, and, if necessary, defend against physical attacks. However, dogs require around the clock care and feeding. In areas where it is legal and the individual is trained and licensed, a concealed carry firearm can be used for personal protection. It requires proper training, proficiency, and knowledge of local laws and regulations. Many people are not comfortable carrying a firearm. There are various smartphone apps designed for personal safety and security. These apps often include features such as emergency alerts, GPS tracking, and virtual escort services. However, these do not incapacitate the user.

An inductive proximity switch, often referred to simply as an inductive switch, is a sensor used to detect the presence of metallic objects without physical contact. Inductive switches operate on the principle of electromagnetic induction. When a metallic object enters the sensing range of the switch, it alters the electromagnetic field around the switch, triggering a response. The core component of an inductive switch is a coil of wire. When an alternating current (AC) is passed through this coil, it generates an electromagnetic field around it. The coil's electromagnetic field extends outward from the sensor. When a metallic object enters this field, it disturbs the field lines, causing a change in the inductance of the coil. The presence of the metallic object alters the inductance of the coil, which is detected by the electronics within the switch. Based on the detected change in inductance, the inductive switch generates an output signal. This signal indicates the presence or absence of the metallic object within the sensing range. Inductive switches typically produce one of two types of output signals: a digital switch provides a binary output, indicating simply whether a metal object is detected or not. An analog switch provides an analog output signal that varies based on the distance or size of the detected metal object.

What is desired is a portable personal security alarm device that incorporates some aspects of the above while having a non-complex triggering mechanism.

SUMMARY

The invention is a portable personal security alarm device that incorporates a piercing alarm and a strobe light, the device having a switch-based or induction-based triggering mechanism. The invention comprises a two-part housing, referred to herein as the finger pull handle and a body.

The finger pull handle has an aperture for inserting a finger, making it easy to grasp and pull, while the top of the finger pull handle provides a comfortable surface for the finger to rest against. The base of the finger pull handle has a pin, which can be steel or magnetic, extending from the base thereof and a pin boss surrounding the pin. The body comprises a housing having the shape of a rectangular prism with a semi-circular base. The body can be fabricated from metal or plastic and have any desired finish such as polished, brushed or painted. The housing is resilient to protect the components from environmental factors and provide a mounting mechanism for the internal electromechanical components and circuitry.

Within the body are the electro-mechanical components providing the personal alarm functionality including power source(s), switch(es) and a load. More specifically, the electro-mechanical components include an pull handle switch, a push-button switch, the switches each separately coupling each of a rechargeable battery and a button battery to a circuit that powers a load such as a high intensity strobe light such as an LED and a high intensity piercing audible alarm.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE FIGURES

For a better understanding of the present invention including the features, advantages and specific embodiments, reference is made to the following detailed description along with accompanying Figures, in which.

DETAILED DESCRIPTION

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

Figure 1:
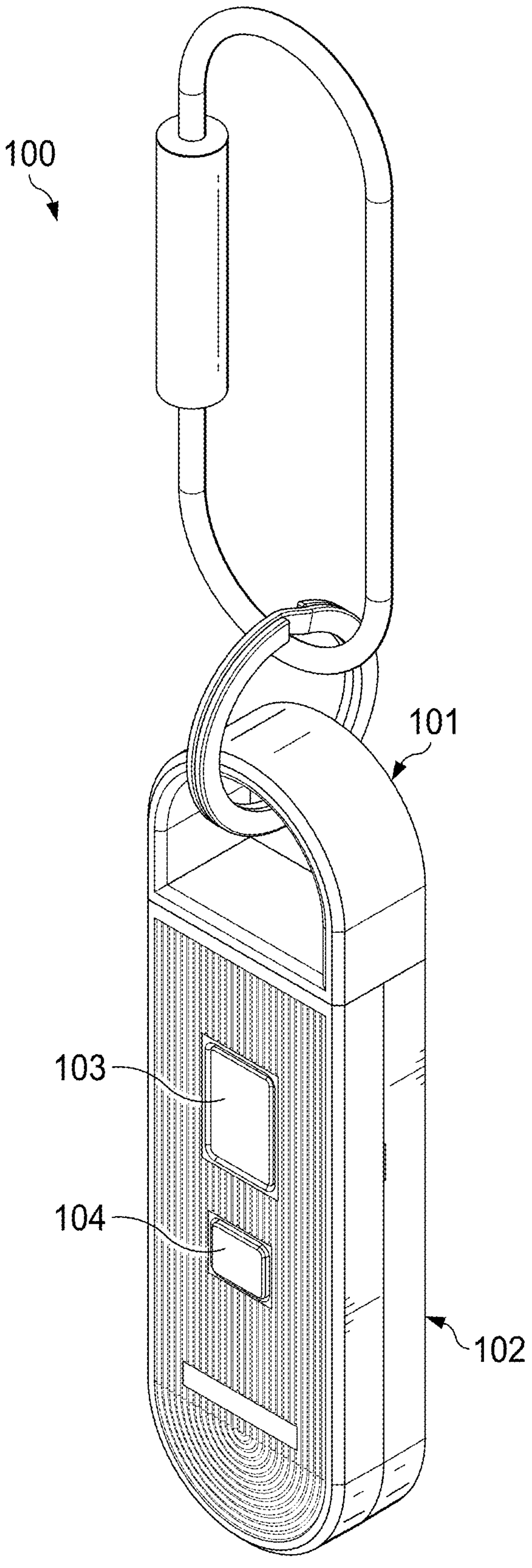
FIG. 1 is a perspective view of the invention.

Referring to FIG. 1, the invention 100 is a portable personal security alarm device that incorporates a piercing alarm and a strobe light, the device having a switch or induction-based triggering mechanism. More particularly, invention 100 comprises a two-part housing, referred to herein as the finger pull handle 101 and a body 102. Body 102 includes therein push button 104 and high intensity strobes 103, which can be light emitting diodes.

Figure 2:
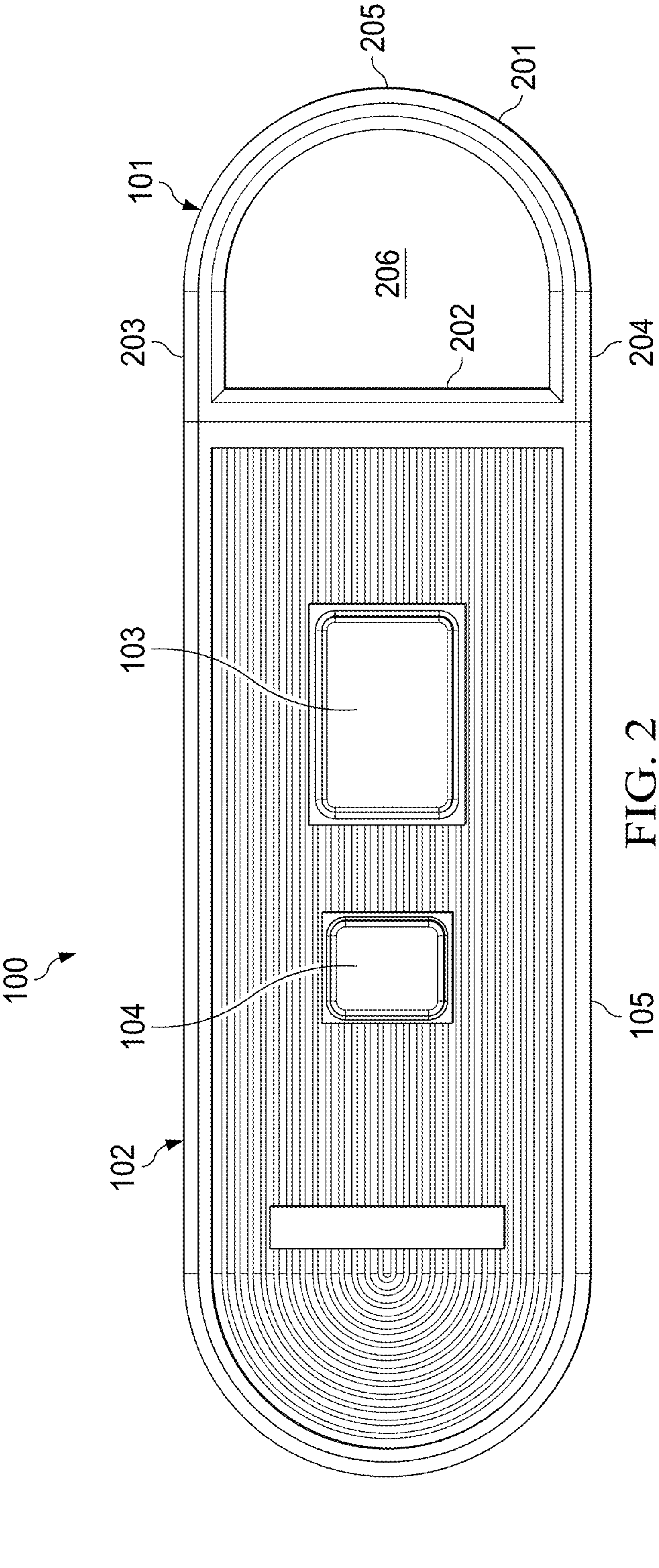
FIG. 2 is a top view of the invention.

As seen in FIG. 2, finger pull handle 101 structurally is an arch section 201 and a base 202, the arch section 201 being a semi-circular section formed from a single circle segment 205 with a first straight section 203 and a second straight section 204. The first straight section 203 and second straight section 204 connect the semi-circular section 205 to the base 202. Body 102 comprises a housing having the shape of a rectangular prism with a semi-circular base. Body 102 can be fabricated from metal or plastic and have any desired finish such as polished, brushed or painted. The housing is resilient to protect the components from environmental factors and provide a mounting mechanism for the internal electromechanical components and circuitry.

The finger pull handle 101 is designed to allow for easy gripping and pulling of the finger pull handle 101 from the body 102. The finger pull handle 101 has an aperture 206 for inserting a finger, making it easy to grasp and pull, while the top of the finger pull handle 101 provides a comfortable surface for the finger to rest against.

Figure 3:
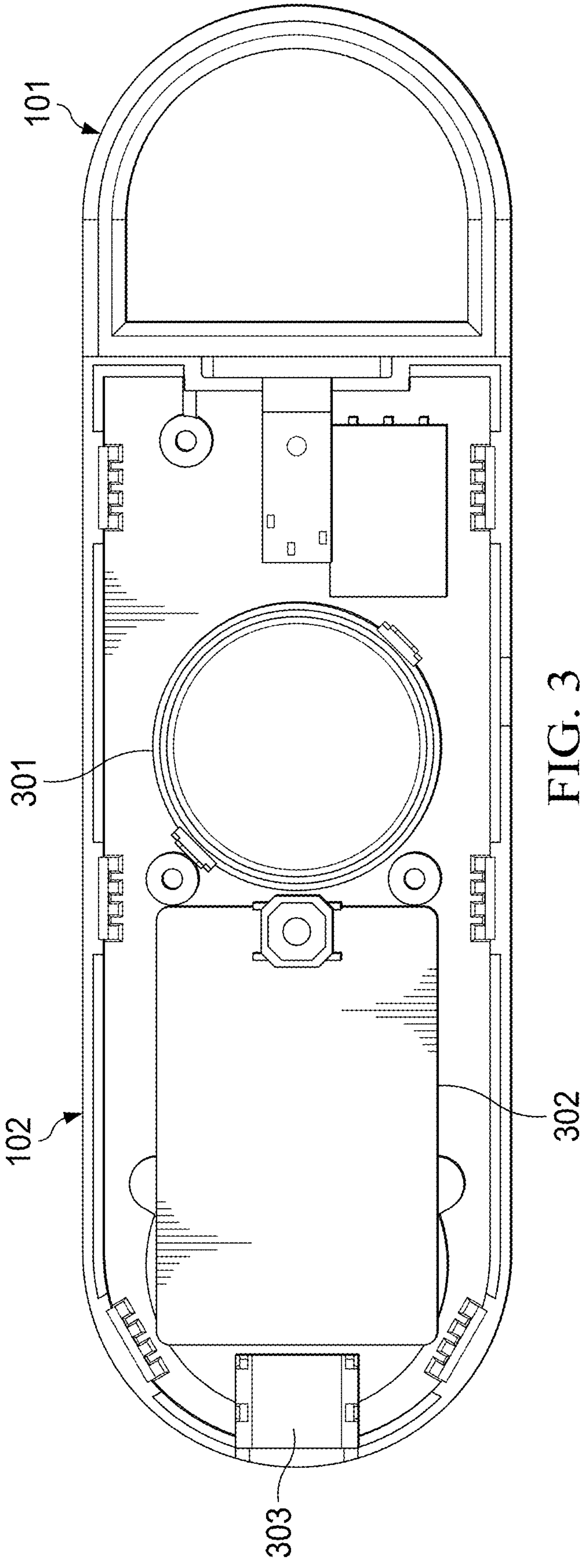
FIG. 3 is a top view of the invention with the top outer housing removed.
Figure 4:
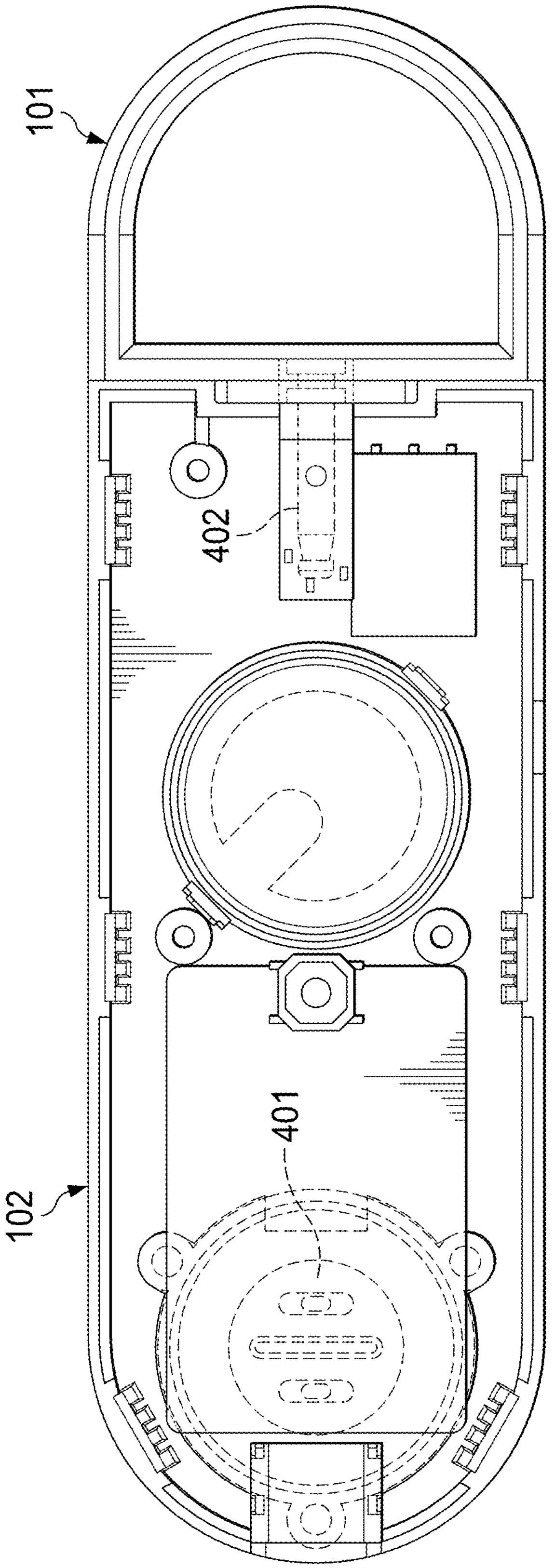
FIG. 4 is a top view of the invention with the top outer housing and additional components removed to illustrate internal components.

Referring now to FIG. 3, there is a top view of invention 100 with the top outer housing removed exposing button battery 301, rechargeable battery 302 and battery charging port 303. FIG. 4 is a top view of invention 100 with the top outer housing and additional components removed to illustrate internal components sire speaker 401 and pin 402. The base 202 of the finger pull handle 101 has extending therefrom pin 402 operable to open and close a switch which couples an internal power source to siren speaker 401 and high intensity strobe light 103. When the finger pull handle 101 is removed from body 102, a circuit from a primary rechargeable battery 302 or secondary battery 301 is completed thus activating siren 401 and high intensity strobe lights 103. Alternatively, finger pull handle 101 can remain in place and push button 104 used to complete the circuit from primary rechargeable battery 302 or secondary battery 301 thus activating siren 401 and high intensity strobe lights 103.

Figure 5:
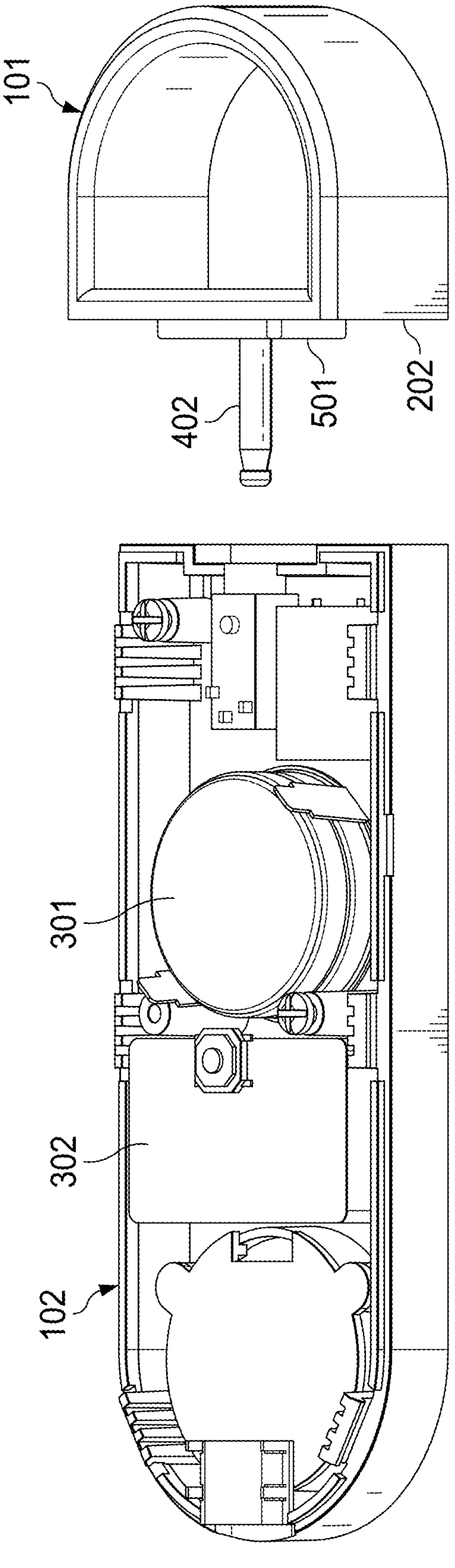
FIG. 5 is a top perspective view of the invention with the outer housing removed and the with the finger pull handle removed from the body.

FIG. 5 is a top perspective view of invention 100 with the outer housing removed and the with the finger pull handle 101 removed from the body 102. The base 202 of the finger pull handle 101 has extending therefrom pin 402 operable to open and close a switch which couples an internal power source to siren speaker 401 and high intensity strobe light 103. Pin 402 can be steel or magnetic, extending from the base thereof and a pin boss 501 surrounding the pin 402. The pin boss 501 is a raised structure, being either cylindrical or rectangular, designed to accommodate and support pin 402. It provides mechanical support and alignment for pin 402, ensuring proper positioning and stability. The pin boss 501 ensures that the finger pull handle 101 sits flush against the surface of the base 102.

Figure 6:
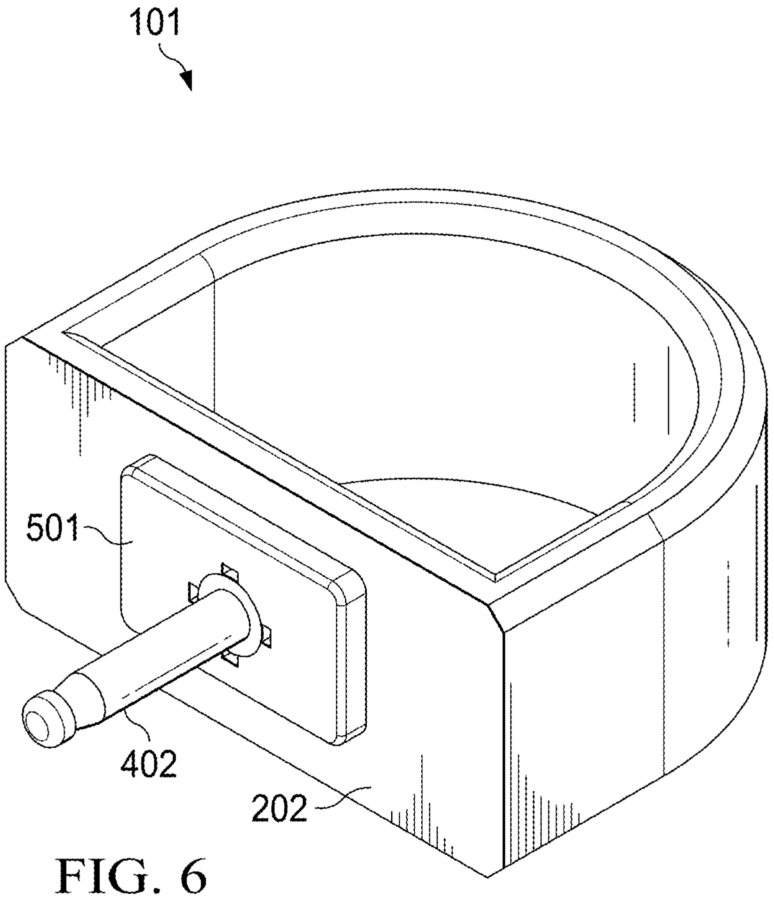
FIG. 6 is a perspective view of the finger pull handle of the invention.

FIG. 6 is a perspective view of finger pull handle 101 of the invention. As seen therein, base 202 of the finger pull handle 101 has extending therefrom pin 402 operable to open and close a switch which couples an internal power source to siren speaker 401 and high intensity strobe light 103. Pin 402 can be steel or magnetic, extending from the base thereof and a pin boss 501 surrounding the pin 402. The pin boss 501 is a raised structure, being either cylindrical or rectangular, designed to accommodate and support pin 402. It provides mechanical support and alignment for pin 402, ensuring proper positioning and stability. The pin boss 501 ensures that the finger pull handle 101 sits flush against the surface of the base 102. Finger pull handle 101 has a curved or arched top surface and a flat bottom surface. At the center of the finger pull handle, there is a semi-circular aperture with specific dimensions to accommodate the insertion of a finger. The finger pull handle can be fabricated from metal or plastic and have any desired finish such as polished, brushed or painted.

Figure 7:
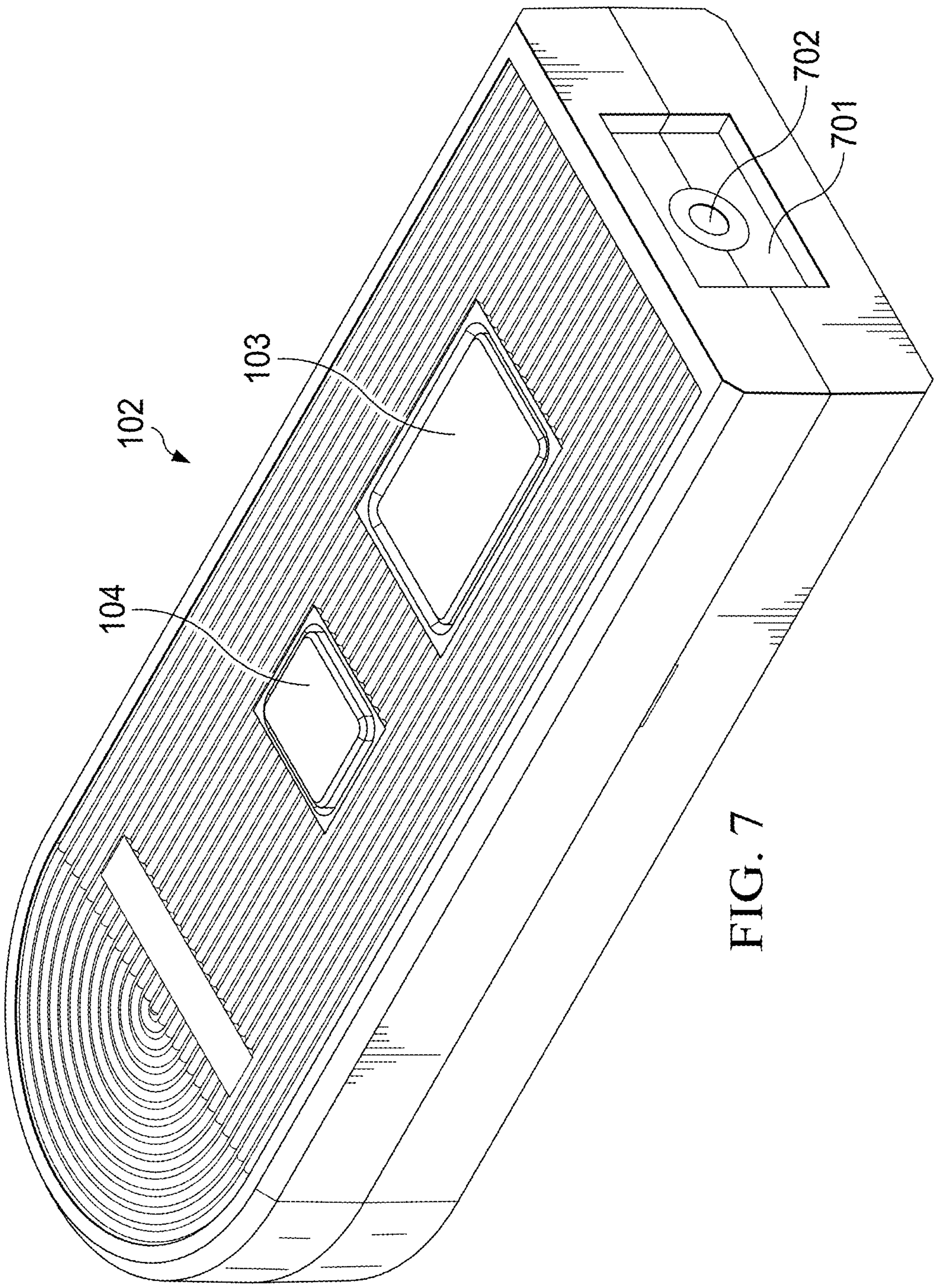
FIG. 7 is a perspective view of the body of the invention.

FIG. 7 is a perspective view of the body 102 of invention 100. Body 102 includes therein push button 104 and high intensity strobes 103, which can be light emitting diodes. Further as seen in FIG. 7 is locator boss 701 which is used to receive pin boss 501. Further, pin aperture 702 is operable to receive pin 402.

Within body 102 are the electro-mechanical components providing the personal alarm functionality including power source(s), switch(es) and a load. More specifically, the electro-mechanical components include a pin triggered switch and a push-button switch. The switches each separately couple each of a rechargeable battery and a button battery to a circuit that powers a load such as a high intensity strobe light such as an LED and a high intensity piercing audible alarm.

Figure 8:
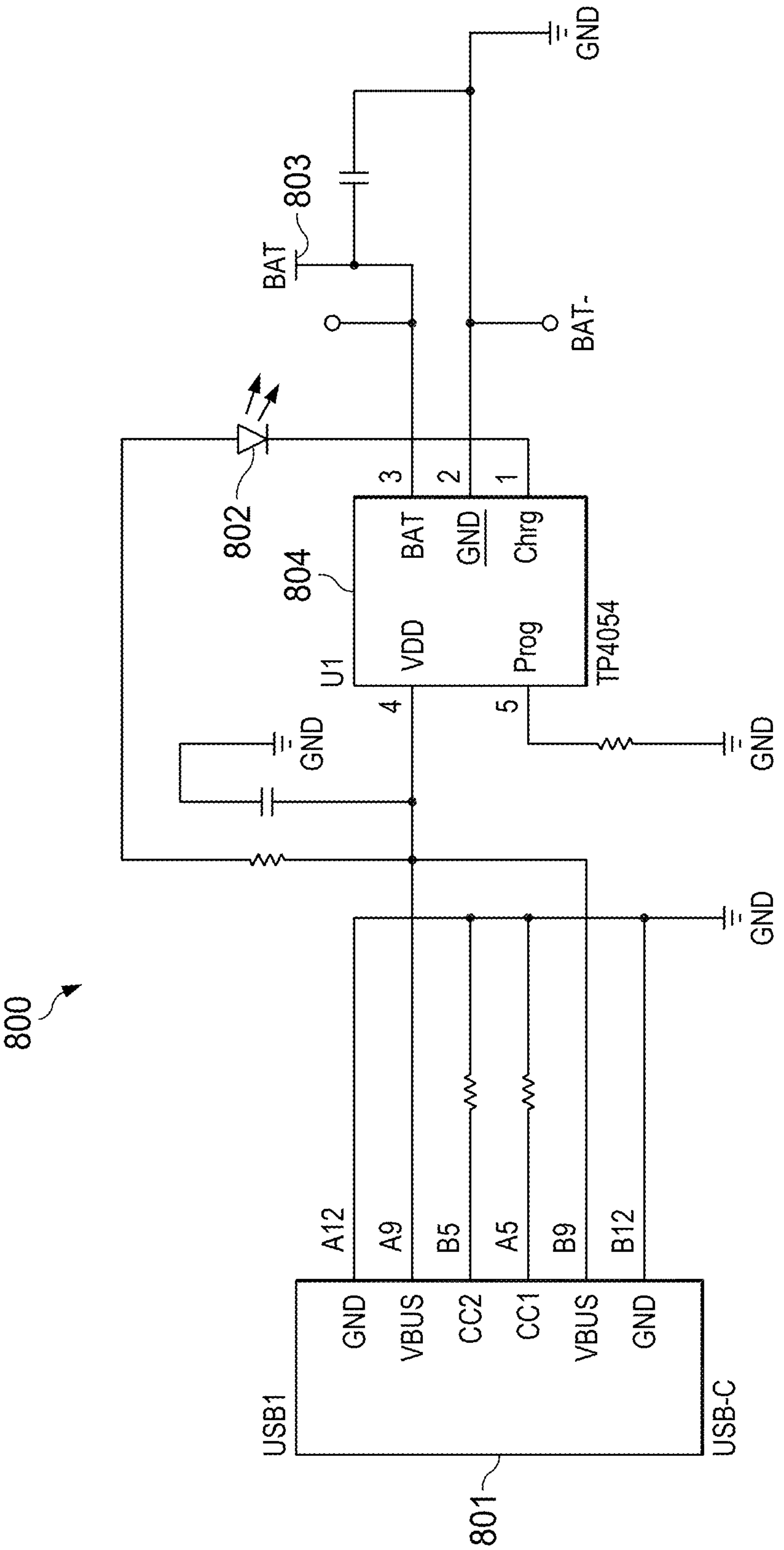
FIG. 8 is a schematic diagram of the battery charging circuit of the invention.

A circuit 800 for recharging the rechargeable battery is seen in FIG. 8. A charge port 801 for receiving power from an external source is coupled to charging integrated circuit 804 that charges battery 803. While charging, light emitting diode 802 illuminates to indicate the status of the charging. FIG. 8 is a schematic diagram 800 of the battery charging circuit of the invention.

Figure 9:
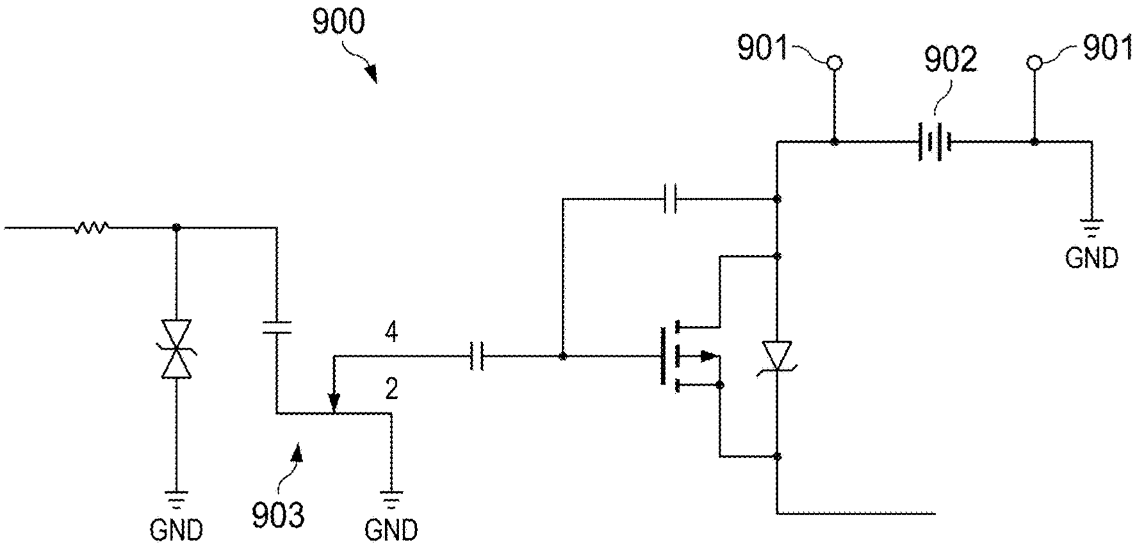
FIG. 9 is a schematic diagram of the circuit that is completed when the steel pin is removed, thus activating the alarm.
Figure 10:
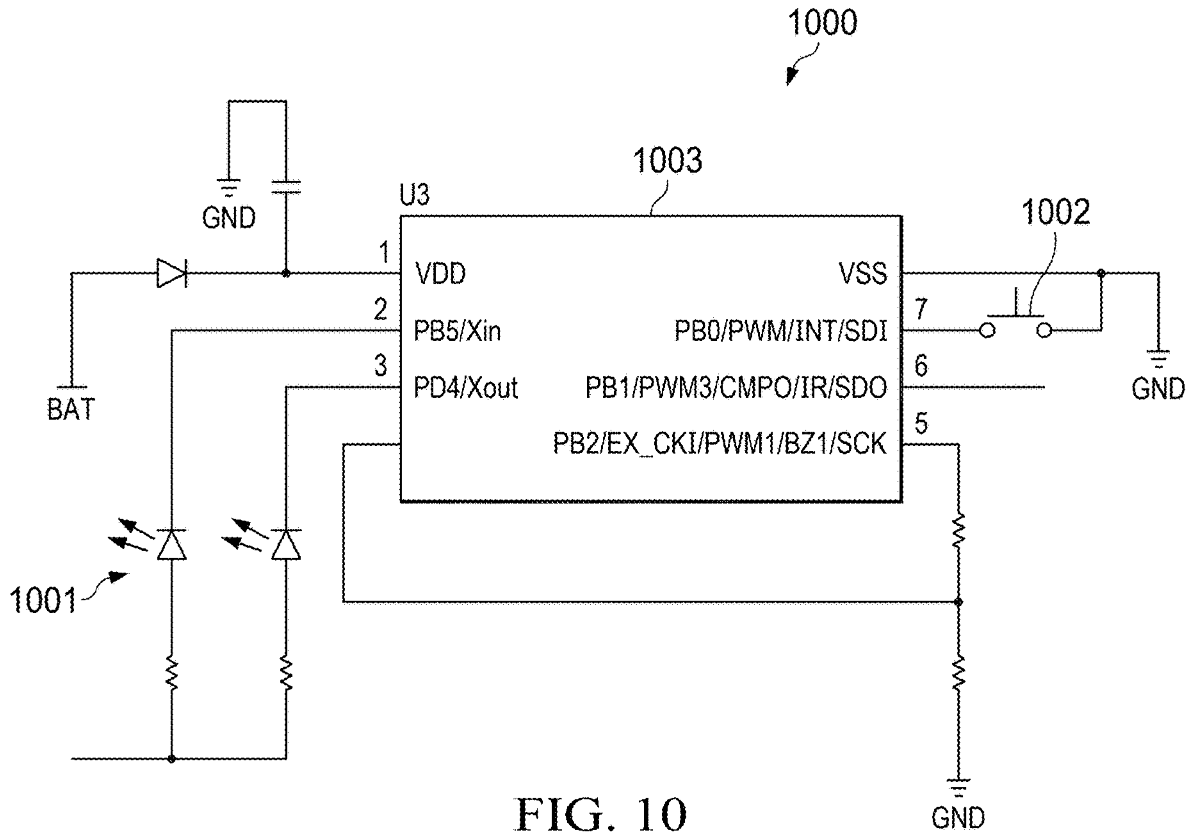
FIG. 10 is a schematic diagram of the high intensity strobe light circuit that is activated when the steel pin is removed.

FIG. 9 is a schematic diagram of circuit 900 that is completed when pin 402 is removed, thus activating the alarm. As seen therein, contacts 901 couple secondary button battery 902 to the circuit 900. Switch 903 couples the battery 902 to the high intensity strobe light and siren circuit. FIG. 10 is a schematic diagram of the high intensity strobe light circuit 1000 that is activated when the pin 402 is removed or switch 1002 (104) is closed thus engaging strobe integrated circuit 1003 to apply a voltage across high intensity strobe lights 1001.

Figure 11:
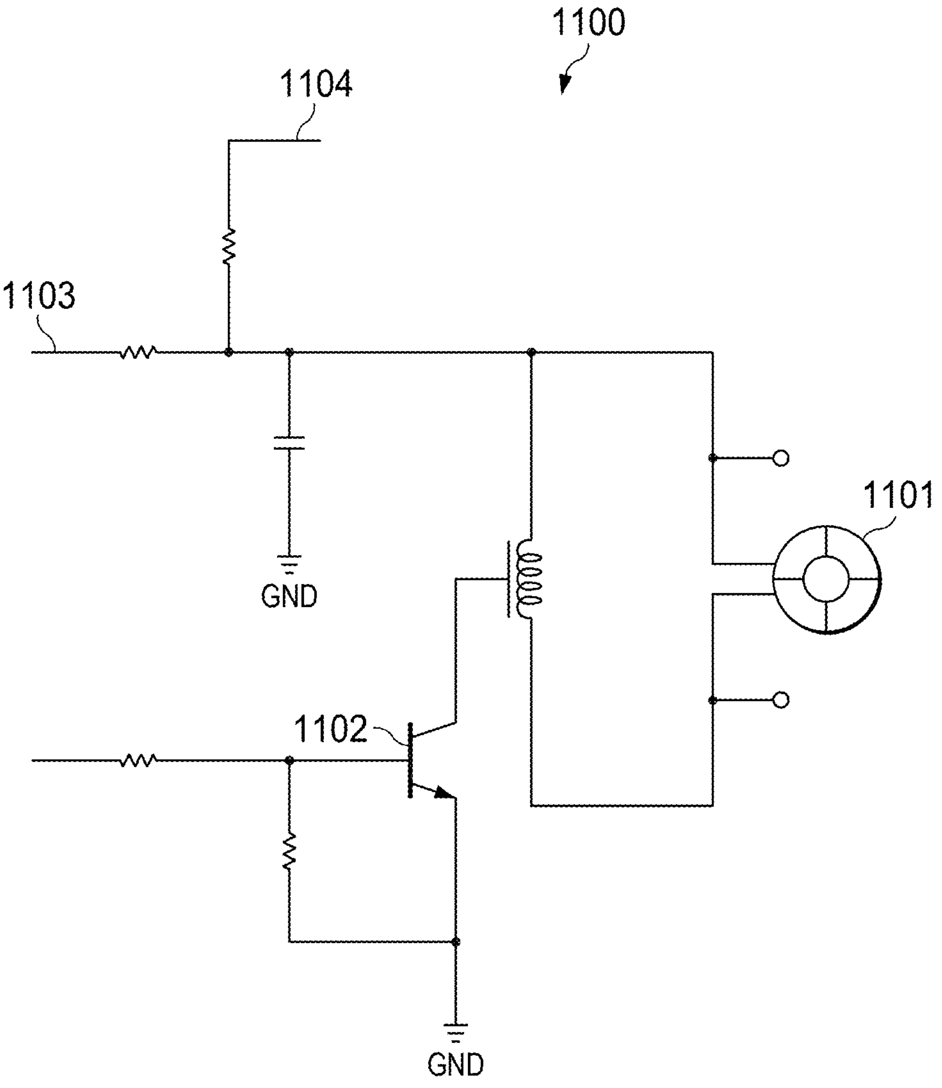
FIG. 11 is a schematic diagram of the siren speaker circuit that is activated when the steel pin is removed.

FIG. 11 is a schematic diagram of the siren speaker circuit 1100 that activates siren 1101 when pin 402 is removed or switch 402 is closed this introducing a base voltage at transistor 1102 which in turn causes current to flow from 1103 and 1105 sufficiently to activate siren 1101.

In an aspect, the switch is an inductive switch that includes a coil that is operable to detect a voltage variation when a pin 402 that is comprised of a magnet or steel is moved nearby. If the magnet is within the body 102 and the pin 402 is steel, then when the finger pull handle 101 and hence pin 402 is removed from body 102, it is operable to produce a sufficient deviation in the magnetic field to induce a voltage in the coil which then is used to close a circuit. There are a variety of ways to implement invention 100 using a reed switch. In one aspect, the objective is to keep the reed switch open when pin 402 is present and closing it when pin 402 is removed. In this aspect, the components needed for the switch include a reed switch, a permanent magnet, pin 402, power source(s) 301/302 and loads, such as the high intensity strobe lights 103 and piercing audible alarm or siren speaker 401. One end of the reed switch is coupled to the positive terminal of the power source(s). The other end of the reed switch is coupled to the load. The load is coupled to the negative terminal of the power source. A permanent magnet is located proximate to the reed switch so that it keeps the switch open when pin 402 is present. When pin 402 is removed, the magnetic field from the permanent magnet no longer influences the reed switch, allowing it to close.

When pin 402 is present, it interacts with the magnetic field of the permanent magnet, causing the reed switch to stay open. The circuit remains open, and the load does not receive power, so it remains off. When pin 402 is removed, the magnetic field from the permanent magnet no longer influences the reed switch. The reed switch closes, completing the circuit, and allowing current to flow through the load.

Similar implementations of the invention include using a magnetic pin that influences the reed switch. Further, a design can include a coil within the circuit that can detect changes in voltage induced by the movement of the magnetic pin or steel pin. Appropriate circuitry can be included to amplify and process the voltage induced in the coil. This circuitry may include amplifiers, filters, and threshold detectors to ensure reliable detection of the magnet's presence.

The invention is a personal alarm device, comprising a finger pull handle having a pin boss on the surface thereof and at least one mechanism for closing and opening a switch, a body having a locator boss on a surface thereof, the finger pull handle boss operable to be received by the locator boss; and the body having located therein circuitry for triggering an alarm when the mechanism for closing and opening a switch is activated. The alarm comprises one of an audible alarm or a siren and at least one high intensity strobe light. The high intensity strobe light is comprised of at least one light emitting diode (LED). The at least one mechanism for closing and opening a switch comprises a pin extending from a base of the finger pull handle operable to be received by an aperture in the body of the invention, the pin operable to open and close a switch within the body wherein the switch is operable to activate an audible alarm or a siren and a high intensity strobe light. The pin is made of either a magnetic or steel material. The pin is supported by a boss in the base of the finger pull handle operable to mate with a pin boss locator integrated into a housing of the body. The pin boss is a raised structure, being one of a cylindrical or rectangular shape and designed to accommodate and support pin. The pin boss and pin boss locator are operable to provide pin positioning and stability.

The finger pull handle includes a curved or arched top surface and a flat bottom surface. The finger pull handle includes an aperture for inserting a finger while the top of the finger pull handle provides a comfortable rest surface for the finger. The body includes therein electro-mechanical components operable to provide audible and visual alarm functionality. The personal alarm functionality includes at least one primary rechargeable battery source, a secondary battery source, at least one switch mechanism and a load comprising at least one high intensity strobe light and one audible alarm or siren, wherein the at least one switch mechanism includes a pin actuator operable to open and close a circuit having alarm functionality.

In an embodiment, two switch mechanisms each separately couple each of a primary rechargeable battery and a secondary button battery to a circuit that powers a high intensity strobe light and piercing audible alarm. The circuit for recharging the rechargeable battery further comprising a charge port for receiving power from an external source. The body includes an outer housing operable to protect the components from external environmental factors and provide a mounting mechanism for the internal electromechanical components and circuitry.

The invention is further a portable alarm device, comprising a finger pull handle having a pin boss on the surface thereof and at least one mechanism for closing and opening a switch, a body having a locator boss on a surface thereof, the finger pull handle boss operable to be received by the locator boss; and the body having located therein circuitry for triggering an alarm when the mechanism for closing and opening a switch is activated wherein the alarm comprises one of an audible alarm or a siren and at least one high intensity strobe light wherein the high intensity strobe light is comprised of at least one light emitting diode (LED).

The at least one mechanism for closing and opening a switch comprises a pin extending from a base of the finger pull handle operable to be received by an aperture in the body of the invention, the pin operable to open and close a switch within the body wherein the switch is operable to activate an audible alarm or a siren and the at least one high intensity strobe light. The pin is made of either a magnetic or steel material and wherein where the pin is supported by a boss in the base of the finger pull handle operable to mate with a pin boss locator integrated into a housing of the body. The pin boss is a raised structure, being one of a cylindrical or rectangular shape and designed to accommodate and support pin and provide pin positioning and stability. The finger pull handle includes a curved or arched top surface and a flat bottom surface and an aperture for inserting a finger while the top of the finger pull handle provides a comfortable rest surface for the finger. The body includes therein electro-mechanical components operable to provide audible and visual alarm functionality further comprising at least one primary rechargeable battery source, a secondary battery source, at least one switch mechanism and a load comprising at least one high intensity strobe light and one audible alarm or siren, wherein the at least one switch mechanism includes a pin actuator operable to open and close a circuit having alarm functionality.

Additional components may include a voltage regulator to ensure that the detection circuitry operates within the voltage range provided by the battery(ies). Further, the load may require a short, large burst of current to operate, hence capacitors for short term storage of high voltage may be desirable.

The load comprises either or both of a high intensity LED strobe light(s) and a loud, piercing audible alarm. The LEDs are selected based on their luminous flux, efficiency, and reliability. Typically, LEDs with a high luminous flux and wide viewing angle are preferred for the invention. The luminous flux of an LED strobe light refers to the total amount of visible light emitted by the LEDs and is typically measured in lumens (lm). For the emergency strobe light application of the invention, the luminous flux can range from a few hundred lumens to several thousand lumens, depending on the desired visibility and coverage area. Higher luminous flux values are generally preferred for outdoor or long-distance signaling applications, while lower values may suffice for indoor or close-range use.

LED efficiency refers to how effectively the LEDs convert electrical power into visible light and is typically measured in lumens per watt (lm/W). Higher efficiency LEDs produce more light output for a given amount of electrical power, resulting in better energy efficiency and longer battery life. For battery-powered LED strobe lights, efficiency can range from around 50 lm/W to over 100 lm/W, with higher efficiency LEDs being more desirable for maximizing battery runtime and minimizing power consumption in the invention.

LED reliability is crucial for this invention, as they need to perform consistently and dependably in critical situations. LED reliability can be assessed based on factors such as the expected lifespan of the LEDs, the quality of the components and construction, and any industry certifications or standards compliance. High-quality LED strobe lights designed for emergency use as in the invention should have a rated lifespan of at least tens of thousands of hours, with durable construction and components to withstand harsh environmental conditions such as temperature extremes, moisture, and physical impacts.

A typical range of luminous flux, efficiency, and reliability for a battery-powered LED strobe light for use in the invention are luminous flux values ranging from a few hundred to several thousand lumens, efficiency values ranging from 50 lm/W to over 100 lm/W, and a rated lifespan of tens of thousands of hours with durable construction.

The LEDs may also require a driver circuit to provide the necessary power to the LEDs. The driver circuit must be capable of handling the high current required by the LEDs and should provide stable voltage regulation to ensure consistent brightness. High-intensity LEDs as used in the invention generate a significant amount of heat, so proper heat dissipation is essential to prevent overheating and ensure the longevity of the LEDs. This may involve incorporating heat sinks, thermal pads, or fans into the design to efficiently dissipate heat away from the LEDs.

The invention further comprises optics to focus and direct the light emitted by the LEDs. This may include lenses, reflectors, or diffusers to control the beam angle and distribution of light. The invention further comprises control circuitry to regulate the flashing frequency of the strobe light. This can be achieved using a microcontroller or dedicated timer circuit to generate precise timing signals for the LED flashing pattern. The LED(s) used in the invention are powered by DC power sources, being a rechargeable battery to drive the LED and audible alarm and a button battery to drive the switches and control circuitry.

In portable alarm devices, such as personal safety alarms or portable security alarms, audible transducers are used to produce sound alerts or alarms. The most common type of audible transducer used in these devices is a piezoelectric buzzer.

The load further comprises a loud piercing audible alarm. In an aspect, such audible alarm is a piezoelectric buzzer. Such a device produces sound by using the piezoelectric effect, where an electrical signal applied to a piezoelectric material (usually a ceramic) causes it to vibrate, generating sound waves. Piezoelectric buzzers can produce a loud and attention-grabbing sound output while consuming relatively low power. Piezoelectric buzzers are available in small form factors, making them suitable for integration into the invention. Despite their small size, the piezoelectric buzzer can produce loud sound output, making them effective for alerting individuals to potential dangers or emergencies. Piezoelectric buzzers consume minimal power, which is advantageous for battery-powered portable alarm devices such as the invention, as it helps to maximize battery life. Piezoelectric buzzers typically have a wide operating voltage range, allowing them to operate effectively with various battery voltages available for use in the invention. Piezoelectric buzzers are reliable and durable making them suitable for use in the invention.

Speakers can also be used as audible transducers in the invention. Speakers typically provide better sound quality compared to piezoelectric buzzers. They can reproduce a wider range of frequencies, resulting in clearer and more natural-sounding alerts or alarms. Disadvantageously, speakers are generally larger and heavier than piezoelectric buzzers, which can impact the overall size and portability of the device. Speakers also typically require more power compared to piezoelectric buzzers, which can affect battery life in battery-powered devices. While speakers are generally durable, they may be more susceptible to damage from impacts or environmental factors compared to piezoelectric buzzers, especially if they have delicate components such as cones or diaphragms.

Mounting hardware is used to securely attach the LED strobe light and loud, audible transducer to the desired location within the housing.

The embodiments shown and described above are only exemplary. Even though numerous characteristics and advantages of the present invention have been set forth in the foregoing description, the disclosure is illustrative only and changes may be made within the principles of the invention to the full extent indicated by the broad general meaning of the terms used herein. Various alterations, modifications and substitutions can be made to the disclosed invention without departing in any way from the spirit and scope of the invention.

What is claimed is:

1. A personal alarm device, comprising:

a body;

a finger pull handle configured to be mated to the body via a pin boss thereon and a pin boss locator on the body, the finger pull handle comprising a curved or arched top surface and a flat bottom surface and an aperture for inserting a finger through the top of the finger pull handle;

a pin extending from a base of the finger pull handle operable to be received by an aperture in the body, the pin operable to open and close a switch within the body wherein the switch is operable to activate an alarm;

the finger pull handle having the pin boss, the pin boss being a raised structure on a flat surface thereof, the pin boss being one of a cylindrical or rectangular shape and designed to support a pin;

a pin boss locator within the body operable to mate with the pin boss to provide positioning and stability to the pin wherein the pin inserted into the aperture in the body;

at least one mechanism for closing and opening a first switch wherein the at least one mechanism for closing and opening the first switch comprises the pin, the pin made of either a magnetic or steel material and operable to open and close the first switch within the body and wherein the first switch is operable to activate the alarm, the alarm comprising one of an audible alarm or a siren and at least one high intensity strobe light wherein the high intensity strobe light is comprised of at least one light emitting diode (LED);

the body having located therein electro-mechanical components operable to provide audible and visual alarm functionality and circuitry for triggering the alarm when the mechanism for closing and opening the first switch is activated wherein electro-mechanical components providing alarm functionality further includes at least one primary rechargeable battery, and a secondary button battery;

the first switch and a load comprising at least one high intensity strobe light and one audible alarm or siren, wherein the first switch includes a pin actuator operable to open and close a circuit having alarm functionality;

further comprising a second switch wherein the first switch mechanism couples the primary rechargeable battery to a circuit that powers a high intensity strobe light and piercing audible alarm and the second switch mechanism couples the secondary button battery to a circuit that powers a high intensity strobe light and piercing audible alarm.

* * * * *